United States Patent [19]
Woodson

[11] Patent Number: 5,202,966
[45] Date of Patent: Apr. 13, 1993

[54] CENTRALIZED BUS ARBITRATION CIRCUIT

[75] Inventor: Alan D. Woodson, Mission Viejo, Calif.

[73] Assignee: Rockwell International Corporation, Seal Beach, Calif.

[21] Appl. No.: 755,951

[22] Filed: Sep. 6, 1991

[51] Int. Cl.⁵ .................................. G06F 13/362
[52] U.S. Cl. ...................... 395/325; 364/DIG. 1; 364/229.2; 364/240.5; 364/242.92; 364/232.9
[58] Field of Search ........................... 395/325, 725

[56] References Cited

U.S. PATENT DOCUMENTS

| | | | |
|---|---|---|---|
| 4,237,534 | 12/1980 | Felix | 395/325 |
| 4,611,297 | 9/1986 | Dudley et al. | 395/325 |
| 4,789,926 | 12/1988 | Clarke | 395/325 |
| 4,797,815 | 1/1989 | Moore | 395/325 |
| 4,881,195 | 11/1989 | DeLong et al. | 364/900 |
| 4,888,684 | 12/1989 | Lilja et al. | 395/325 |
| 5,021,950 | 6/1991 | Nishikawa | 395/325 |

Primary Examiner—Michael R. Fleming
Assistant Examiner—Debra A. Chin
Attorney, Agent, or Firm—H. Fredrick Hamann; George A. Montanye; Tom Streeter

[57] ABSTRACT

The centralized bus arbitration circuit 20 shown here allows processor 12-18 access to a bus 10 for a period of time determined by either the processor 12-18 or the circuit 20, as appropriate. Indefinite access and immediate return of control to the bus arbitration circuit 20 are also provided for.

2 Claims, 4 Drawing Sheets

CENTRALIZED BUS ARBITRATION CIRCUIT

This invention was made with Government support under Contract No. F08635-89-C-0083 awarded by the Air Force. The Government has certain rights in this invention.

BACKGROUND OF THE INVENTION

The present invention relates to arbitrating access to a data processing bus, and has particular relation to arbitrating access among a multiplicity of competing processors.

Many processors may share a single bus. The processors do not have any special bus arbitration features, but they do have internal memory. Each processor may have different requirements for the amount and frequency of bus access. A method is needed to give each processor only the amount of bus access time required. A method for locking the bus for exclusive access by a single processor is also needed.

SUMMARY OF THE INVENTION

It is an objective of the present invention to provide for the needs stated above. It does so by providing a bus arbitration circuit which also has access to the bus (or, if convenient, to a separate arbitration bus).

It is a feature of the present invention that the bus arbitration circuit may be entirely separate from any of the processors.

It is an advantage of the present invention that, by being entirely separate, valuable memory and processor time is not consumed in arbitrating access among the various processors.

DETAILED DESCRIPTION OF A PREFERRED EMBODIMENT

Figure 1:
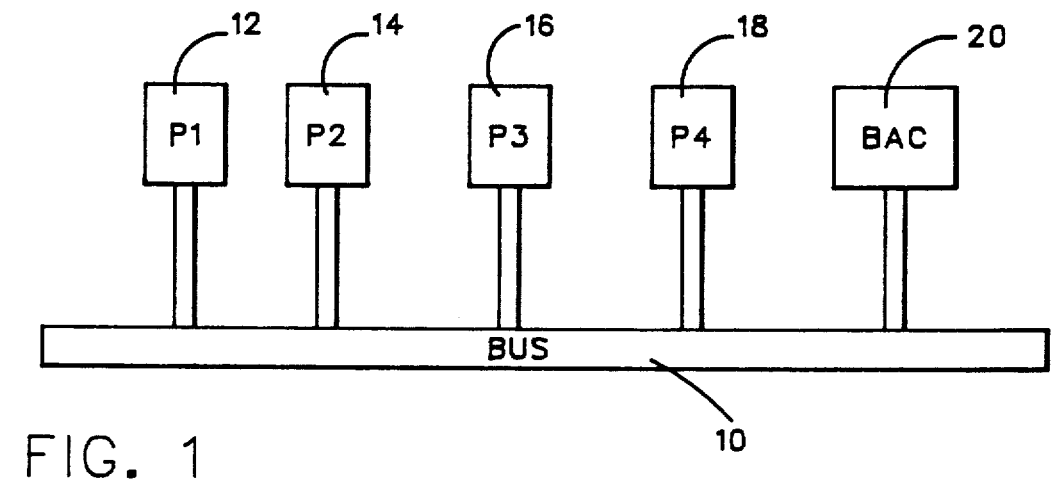
FIG. 1 is a schematic drawing of a plurality of processors seeking access to a common bus, and of a bus arbitration circuit, also with access to the bus.

FIG. 1 shows a bus 10, to which access is sought by four processors, P1 through P4, reference numerals 12 through 18, respectively. Access to the bus 10 is controlled by a bus arbitration circuit (BAC) 20.

Figure 2:
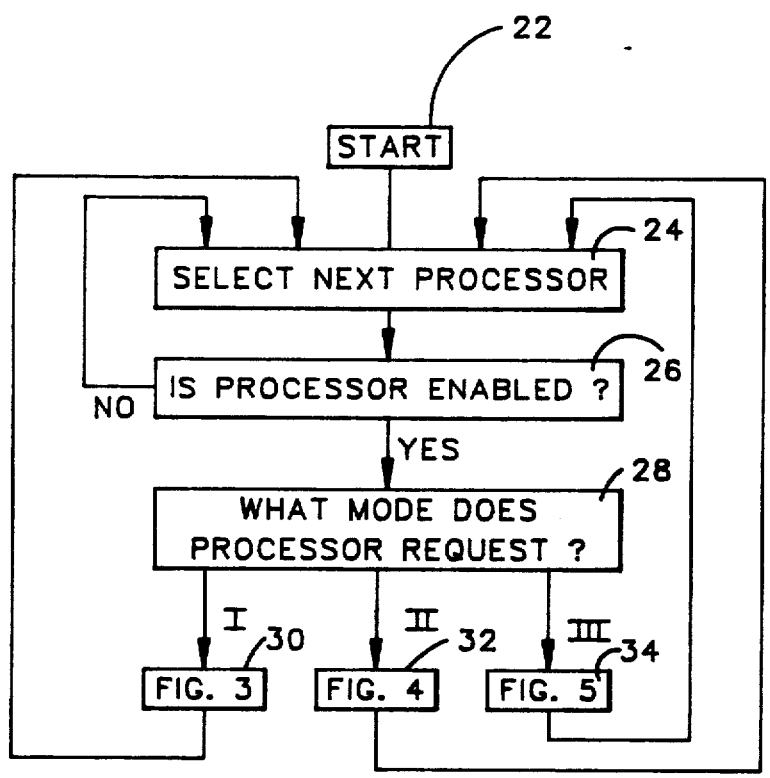
FIG. 2 is a flow chart showing an overview of the present invention.

FIG. 2 shows the operation of the BAC 20. From the start 22, the BAC 20 selects the next processor 24, if that processor is permitted to use the bus, and interrogates 28 as to which mode of access the processor requests. The first mode 30 is described in greater detail with respect to FIG. 3. The second mode 32 is described with respect to FIG. 4. The third mode 34 is described with respect to FIG. 5.

Figure 3:
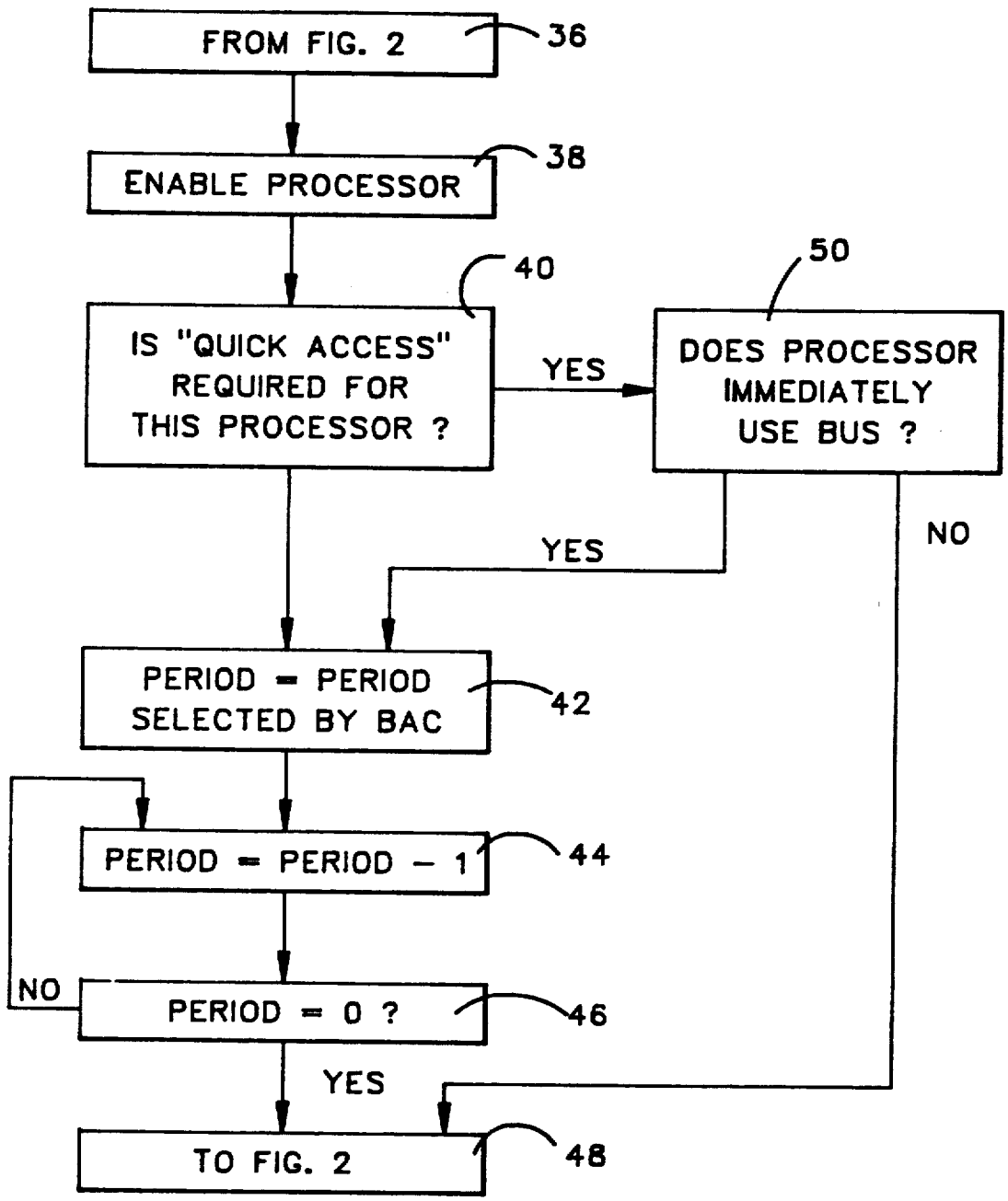
FIGS. 3 through 5 are flow charts showing, respectively, the operation of the present invention depending on the mode of access requested by the processor at hand.

In FIG. 3, the invocation of the first mode 30 from FIG. 2 is shown by reference numeral 36. In first mode operation, the processor has access to the bus for a period determined by the BAC 20. In this mode, the period for which the processor will have access is selected by the BAC 20. The BAC 20 first enables 38 the processor at hand, and then determines 40 from its own memory whether or not "quick access" is required for this particular processor. If it is not, then a period pf access is set 42 to be equal to a period selected by the BAC 20, based on its priorities rather on the priorities of the particular processor. This period is then decremented 44 by 1 with each clock cycle until it reaches zero 46, at which point access to the bus is returned 48 to the BAC 20.

The foregoing decremental procedure is used when "quick access" is not required. If "quick access" is required, then the BAC 20 inquires 50 whether or not the processor immediately uses the bus. If it does, then the decrementation procedure is followed, the same as if "quick access" had not been required for the processor. If the processor does not immediately use the bus, then access to the bus is returned 48 immediately to the BAC 20.

Figure 4:
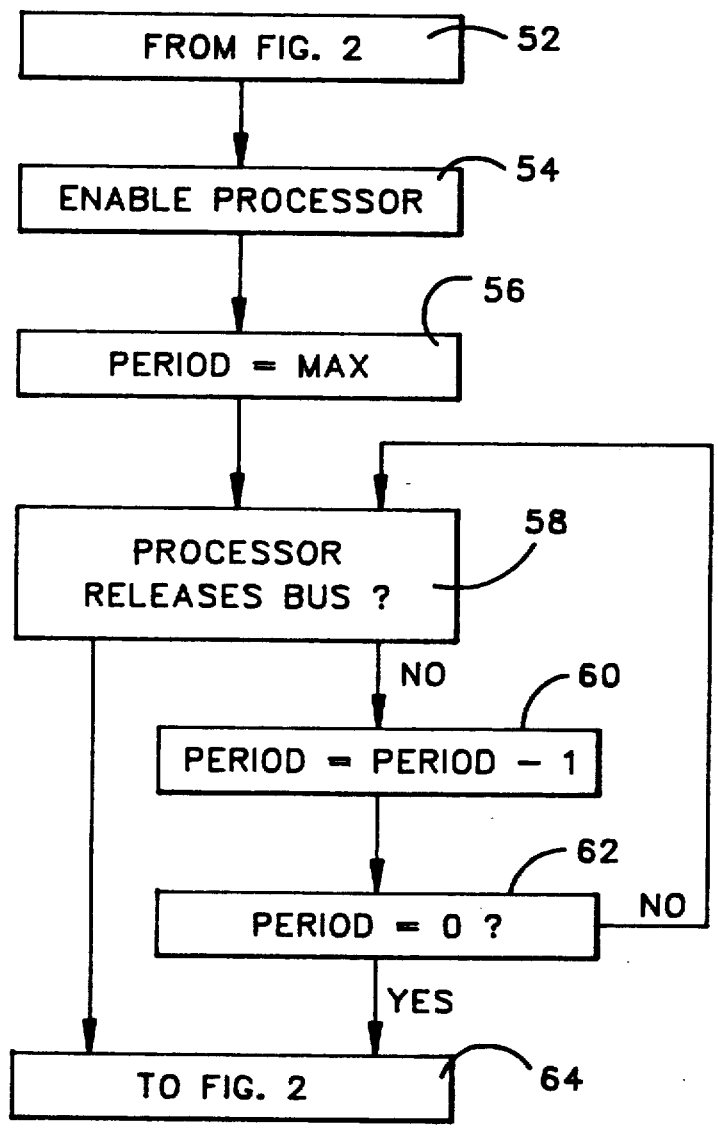

In FIG. 4, the second mode 32 is invoked at step 52. In second mode operation, the processor has access to the bus for a period of time determined by the processor, not to exceed some preestablished maximum. As in FIG. 3, the first step 54 is to enable the processor. The access period is then set 56 at some preestablished maximum. Thereafter, at each clock cycle, the BAC 20 is open for a signal from the processor that it is finished with the bus and is releasing it 58 back to the BAC 20, in which case the operation shown in FIG. 2 is resumed 56. If no such signal is received by the BAC 20, then the period is decremented by one 60 until it reaches zero 62, at which time FIG. 2 operation is resumed 54.

Figure 5:
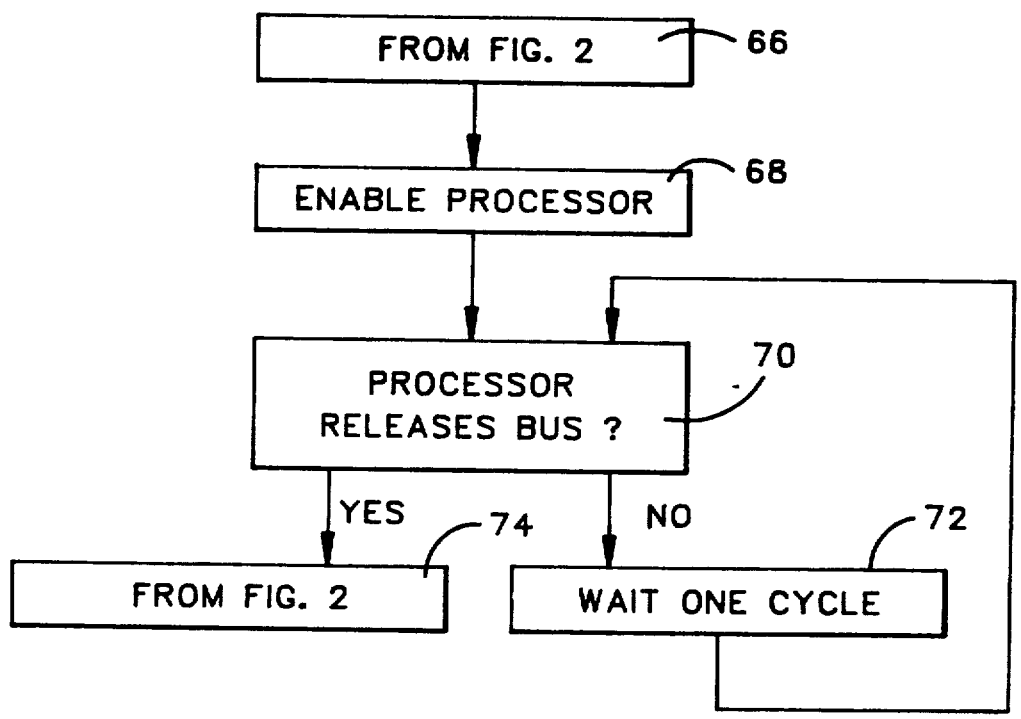

FIG. 5 shows fourth mode operation 34. In the fourth mode, the processor at hand can lock the bus indefinitely to enforce exclusive access for critical operations. When fourth mode operation is invoked 66, the BAC 20 first enables 68 the processor, then awaits 70 a signal that the processor has released the bus. If no such signal appears, then the BAC waits one cycle 72, and again awaits 70 a release signal. When the release signal finally arrives, FIG. 2 operation is resumed 74.

INDUSTRIAL APPLICABILITY

The present invention is capable of exploitation in industry, and can be used, whenever centralized bus arbitration is desired. It is capable of being made out of components which, taken separate and apart from one another, may be entirely conventional, or it may be made from their nonconventional counterparts.

While a preferred embodiment has been described herein, the true spirit and scope of the present invention are not limited thereto, but are limited only by the appended claims.

What is claimed is:

1. A method for arbitrating access to a bus accessible by a plurality of processors, the method comprising the steps of:
   (a) selecting a next processor;
   (b) determining whether the processor is permitted to use the bus;
   (c) if the processor is not permitted to use the bus, then returning to step (a);
   (d) if the processor is permitted to use the bus, then interrogating the processor as to the mode of operation requested by the processor;
   (e) if a first mode is requested, then:
      (1) determining whether quick access is required;
      (2) performing steps (a) through (g) if quick access is required and the processor does not use the bus immediately;
      (3) setting a period to a predetermined number;

(4) allowing bus access to the processor if the period is greater than zero;
(5) decrementing the period by one;
(6) repeating the operation of the means described in (4) and (5) until the period equals zero, at which time steps (a) through (g) are performed;

(f) if a second mode is requested, then:
(1) setting a period to a predetermined maximum;
(2) determining iof the processor has released the bus;
(3) allowing the bus access to the processor if the processor has not released the bus and
(4) decrementing the period by one; and
(5) repeating steps (2) through (4) until the period equals zero or the processor released the bus, at which time steps (a) through (g) are performed; and (g) if a third mode is requested, then:
(1) determining if the processor has released the bus;
(2) allowing the bus access to the processor if the processor has not released the bus;
(3) waiting one clock cycle; and
(4) repeating steps (2) and (3) until the processor releases the bus, at which time steps (a) through (g) are performed.

2. An apparatus for arbitrating access to a bus accessible by a plurality of processors, the apparatus comprising:
(a) means for selecting a next processor;
(b) means, responsive to a completed actuation of means (a), for determining whether said next processor is permitted to use the bus;
(c) means, responsive to a negative determination by means (b), for repeating the operation of means (a);
(d) means, responsive to an affirmative determination by means (b), for interrogating the processor as to the mode of operation requested by the processor;
(e) means, responsive to a completed actuation of means (d) and a resultant request for a first mode of operation, such means comprising:
(1) means for determining whether quick access is required;
(2) means, responsive to an affirmative determination by means (1) and the concurrent failure of the processor to use the bus immediately, for performing the operation of means (a);
(3) means, responsive to a completed actuation of means (2), for setting a period to a predetermined number;
(4) means, responsive to a completed actuation of means (3) or means (6) and a resultant period which is greater than zero, for allowing bus access to the processor;
(5) means, responsive to a completed actuation of means (4), for decrementing the period by one;
(6) means, responsive to a completed actuation of means (5), for performing the operation of means (4) until the period equals zero, and for then performing the operation of means (a);

(f) means, responsive to a completed actuation of means (d) and a resultant request for a second mode of operation, such means comprising:
(1) means for setting a period to a predetermined maximum;
(2) means, responsive to a completed actuation of means (1) or (5), for determining if the processor has released the bus;
(3) means, responsive to a negative determination by means (2) and the concurrent period which is greater than zero, for allowing the bus access to the processor;
(4) means, responsive to a completed actuation of means (3), for decrementing the period by one; and
(5) means, responsive to a completed actuation of means (5), for performing the operation of means (2) until the period equals zero or the processor releases the bus, and for then performing the operation of means (a);

(g) means, responsive to a completed actuation of means (d) and a resultant request for a third mode of operation, such means comprising:
(1) means for determining if the processor has released the bus;
(2) means, responsive to a negative determination by means (2) and the concurrent period which is greater than zero, for allowing the bus access to the processor;
(3) means, responsive to a completed actuation of means (2), for waiting one clock cycle; and
(4) means, responsive to a completed actuation of means (5), for performing the operation of means (2) until the processor releases the bus, and for then performing the operation of means (a).

* * * * *